United States Patent [19]

Satoh et al.

[11] Patent Number: 5,532,056

[45] Date of Patent: Jul. 2, 1996

[54] FIXING BELT

[75] Inventors: Makoto Satoh; Noboru Shimamoto, both of Annaka; Hiroshi Takei, Usui-gun; Takeshi Hashimoto, Annaka, all of Japan

[73] Assignee: Shin-Etsu Chemical Co., Ltd., Tokyo, Japan

[21] Appl. No.: 174,546

[22] Filed: Dec. 28, 1993

[30] Foreign Application Priority Data

Dec. 28, 1992 [JP] Japan .................................. 4-361088

[51] Int. Cl.$^6$ ........................... B32B 15/08; G03G 15/20
[52] U.S. Cl. ..................... 428/332; 355/212; 355/275; 355/277; 355/279; 355/285; 428/36.9; 428/36.91; 428/36.92; 428/331; 428/337; 428/421; 428/447; 428/450; 428/451; 428/473.5; 428/480; 430/98; 430/102
[58] Field of Search .................... 355/212, 275, 355/277, 279, 285; 428/36.9, 36.91, 36.92, 447, 331, 332, 337, 421, 450, 451, 473.5, 480; 430/98, 102

[56] References Cited

U.S. PATENT DOCUMENTS 5,354,612  10/1994  Miyabayashi .......................... 428/331

OTHER PUBLICATIONS

C. V. Wilber "IBM Technical Disclosure Bulletin", vol. 21 No. 7 Dec. 1978.

*Primary Examiner*—D. S. Nakarani
*Attorney, Agent, or Firm*—Millen, White, Zelano, & Branigan

[57] ABSTRACT

A fixing belt is prepared by forming a layer of fluorosilicone rubber or fluorocarbon-siloxane rubber on the outer surface of an endless belt body. The fixing belt shows good toner release and minimal swell with silicone oil and is thus helpful in producing electrophotographic quality images.

11 Claims, 1 Drawing Sheet

FIXING BELT

BACKGROUND OF THE INVENTION

1. Field of the Invention

This invention relates to a fixing belt for use in image forming apparatus such as electrophotographic machines, facsimile machines and printers.

2. Prior Art

Known examples of prior art fixing belts used in such image forming apparatus include a belt based on fluororesin film and a belt prepared by coating a heat resistant resin film on its surface with a silicone rubber composition followed by heat curing as disclosed in Japanese Patent Application Kokai (JP-A) No. 115279/1992.

The fixing belt based on fluororesin is too hard to follow fine irregularities when used in image forming apparatus. In fixing an image on recording paper through application of heat and pressure, the image once transferred to the recording paper can be transferred back to the belt, resulting in a lowering of image quality.

The fixing belt in the form of a heat resistant resin film having a silicone rubber layer formed on its surface has the advantage that toner release is improved due to a small amount of silicone oil in the silicone rubber. Since bleeding of the oil is limited, however, the toner release experiences a change with time. Without a supply of additional silicone oil, it is difficult to completely suppress the phenomenon of reverse transfer of an image from the recording paper to the fixing belt. Especially existing color image forming apparatus such as color copying machines cannot dispense with supply of silicone oil. Problems arise when a belt having an outermost layer formed of silicone rubber which can be swollen by silicone oil is used in color image forming apparatus.

SUMMARY OF THE INVENTION

An object of the present invention is to provide a fixing belt having at least equivalent toner release to silicone rubber, subject to minimal swelling with silicone oil, and ensuring formation of quality images.

We have found that an endless belt body having a layer of fluorosilicone rubber or fluorocarbonsiloxane rubber formed on the outer surface thereof is effective as a fixing belt in an image forming apparatus because it exhibits at least equivalent toner release to silicone rubber, experiences minimal swelling with silicone oil, and ensures formation of quality images.

Better results are obtained when the fluorosilicone rubber has a perfluoroalkyl ether or perfluoroalkyl group in a side chain and when the fluorocarbonsiloxane rubber has a perfluoroalkyl ether and/or perfluoroalkyl group in a backbone. More effective is a cured product of a fluorosilicone rubber composition or a fluorocarbonsiloxane rubber composition as defined below.

The fluorosilicone rubber composition is comprised of the following components (A) to (C):

(A) a diorganopolysiloxane of the general formula (1):

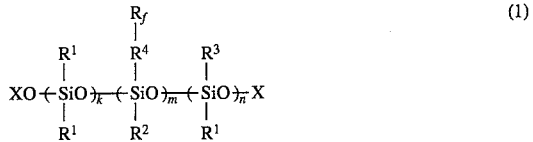

wherein each of $R^1$ and $R^2$, which may be identical or different, is a substituted or unsubstituted monovalent hydrocarbon group free of an aliphatic unsaturated bond, $R^3$ is a monovalent aliphatic unsaturated hydrocarbon group, $R^4$ is a divalent hydrocarbon group free of an aliphatic unsaturated bond or a group of the general formula (2):

wherein each of $R^5$ and $R^6$ is a divalent hydrocarbon group free of an aliphatic unsaturated bond, Rf is a perfluoroalkyl or perfluoroalkyl ether group, X is a hydrogen atom or a group of the general formula (3):

wherein each of $R^7$, $R^8$, and $R^9$, which may be identical or different, is a substituted or unsubstituted monovalent hydrocarbon group, letters k and m are integers of at least 1, and n is 0 or an integer of at least 1, (B) a filler, and (C) a curing agent.

The fluorocarbonsiloxane rubber composition is comprised of the following components (D) to (G):

(D) a fluorocarbon polymer predominantly comprising a fluorocarbonsiloxane having a recurring unit of the general formula (4):

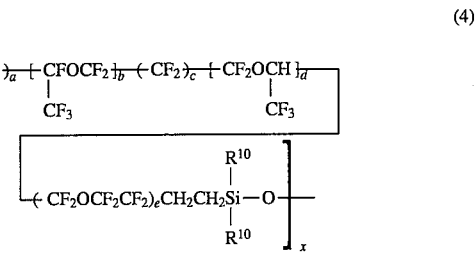

wherein $R^{10}$ is a substituted or unsubstituted monovalent hydrocarbon group, letter x is an integer of at least 1, each of a and e is 0 or 1, each of b and d is an integer of 1 to 4, and c is an integer of 0 to 8, said fluorocarbon polymer containing an aliphatic unsaturated group, (E) an organopolysiloxane and/or fluorocarbonsiloxane containing at least two silylidyne (≡SiH) groups in a molecule, the content of silylidyne group being 1 to 4 mol per mol of the aliphatic unsaturated group in said fluorocarbonsiloxane rubber composition, (F) a catalytic amount of a catalyst and (G) a filler.

BRIEF DESCRIPTION OF THE DRAWING

The only FIGURE.

DETAILED DESCRIPTION OF THE INVENTION

Figure 1:
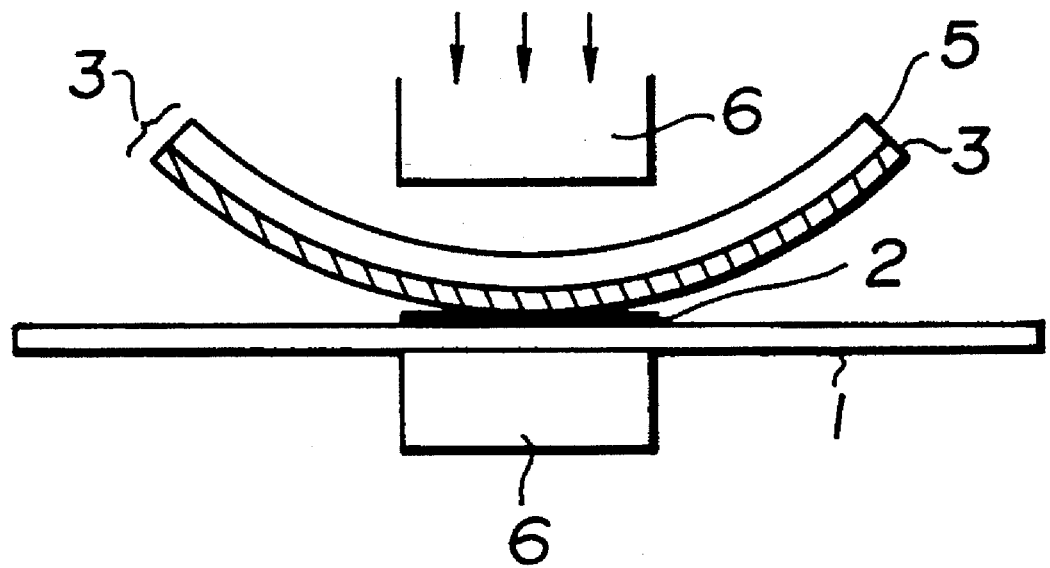
FIG. 1 illustrates a toner release test from the Examples and Comparative Example.

According to the present invention, the fixing belt is obtained by forming a layer of fluorosilicone rubber or fluorocarbonsiloxane rubber on the outer surface of an endless belt body.

The endless belt body may be formed of heat resistant material which can be used at 150° to 180° C., for example, polyimide resins, fluororesins, and polyester resins, or metals such as stainless steel and nickel. The belt body of such a heat resistant resin or metal may have any desired thickness while a wall thickness of about 20 to 300 μm, especially about 40 to 100 μm is preferred from the standpoints of heat transfer and heat resistance.

In one embodiment, a layer of fluorosilicone rubber is formed on the outer surface of a belt body. Preferably the fluorosilicone rubber has a perfluoroalkyl ether or perfluoroalkyl group in a side chain. More preferably, the fluorosilicone rubber layer is a cured product of a fluorosilicone rubber composition comprising (A) a diorganopolysiloxane, (B) a filler, and (C) a curing agent.

The diorganopolysiloxane (A) is of the following general formula (1).

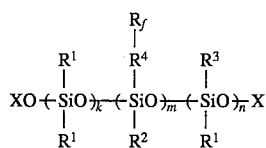
(1)

Each of $R^1$ and $R^2$, which may be identical or different, is a substituted or unsubstituted monovalent hydrocarbon group free of an aliphatic unsaturated bond. Preferably $R^1$ and $R^2$ are hydrocarbon groups having 1 to 12 carbon atoms, especially 1 to 8 carbon atoms. Examples include alkyl groups such as methyl, ethyl, isopropyl, and butyl; cycloalkyl groups such as cyclohexyl and cyclopentyl; aryl groups such as phenyl, tolyl, and xylyl; aralkyl groups such as benzyl and phenylethyl; halogenated hydrocarbon groups such as chloromethyl, chloropropyl, and chlorocyclohexyl; and cyano-hydrocarbon groups such as 2-cyanoethyl. Preferred among these are methyl, ethyl and phenyl groups.

$R^3$ is a monovalent aliphatic unsaturated hydrocarbon group, preferably having 2 or 3 carbon atoms. Exemplary are alkenyl groups having 2 or 3 carbon atoms such as vinyl, allyl and ethynyl groups. Vinyl is most preferred.

$R^4$ is a divalent group separating a silicon atom and a fluorinated organic group Rf, more specifically a divalent hydrocarbon group free of an aliphatic unsaturated bond or a divalent hydrocarbon group having an ether group of the general formula (2):

$$-R^5-O-R^6- \qquad (2)$$

wherein each of $R^5$ and $R^6$ is a divalent hydrocarbon group free of an aliphatic unsaturated bond. The group represented by $R^4$ preferably has 1 to 8 carbon atoms. Examples are given below. —$CH_2$—, —$CH_2CH_2$—, —$CH_2CH_2CH_2$—, —$(CH_2)_6$—,

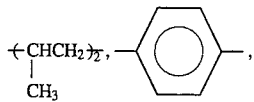

—$CH_2O$—$CH_2$—, —$CH_2CH_2CH_2$—O—$CH_2$—, —$CH_2O$—$CH_2CH_2CH_2$—,

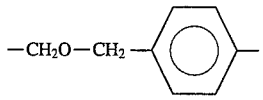

Preferred $R^4$ groups are —$CH_2CH_2$—, —$CH_2CH_2CH_2$—, and —$CH_2CH_2CH_2$—O—$CH_2$—.

Rf is a perfluoroalkyl or perfluoroalkyl ether group. The perfluoroalkyl groups are typically represented by the formula: $C_pF_{2p+1}$ wherein p is an integer of 4 to 10, with $C_6F_{13}$—, $C_8F_{17}$—, and $C_{10}F_{21}$— being preferred. The perfluoroalkyl ether groups preferably have 5 to 15 carbon atoms and their preferred examples are shown below.

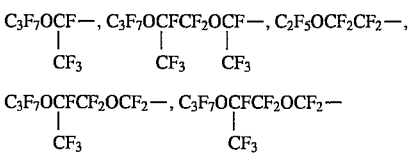

X is a hydrogen atom or a group of the general formula (3):

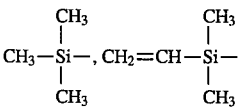
(3)

wherein each of $R^7$, $R^8$, and $R^9$, which may be identical or different, is a substituted or unsubstituted monovalent hydrocarbon group, preferably having 1 to 8 carbon atoms. Exemplary groups of $R^7$, $R^8$, and $R^9$ are hydrocarbon groups free of an aliphatic unsaturated bond as exemplified for $R^1$, and alkenyl groups such as vinyl, allyl, and hexenyl groups. More preferably, X is a hydrogen atom or groups of the following formulae.

In formula (1), letter k is an integer of at least 1, preferably 100 to 10,000, m is an integer of at least 1, preferably 50 to 5,000, and n is 0 or an integer of at least 1. Preferably m/(k+m+n) ranges from 1/50 to 1/3. It is preferred that n is an integer of 1 or more if $R^7$ to $R^9$ are groups other than alkenyl where the fluorosilicone rubber composition is vulcanized using an organic peroxide as component (C) as will be described later.

The organopolysiloxanes (A) preferably have a viscosity of 100 to 100,000,000 centistokes (cSt) at 25° C. and may be used alone or in admixture of two or more.

The filler as component (B) is any of fillers commonly used in conventional silicone rubber compositions. Examples include reinforcing fillers such as fumed silica, precipitated silica, carbon powder, titanium dioxide, aluminum oxide, ground quartz, talc, sericite, and bentonite, and fibrous fillers such as asbestos, glass fibers and organic fibers. Preferred are silica powder such as fumed silica and precipitated silica.

Preferably these fillers are blended in amounts of about 10 to 300 parts, more preferably about 20 to 200 parts by weight per 100 parts by weight of component (A). On this basis, less than 10 parts of the filler would not be effective for reinforcement whereas more than 300 parts of the filler would undesirably result in a cured product having low mechanical strength.

Component (C) is a curing agent which is selected from organic peroxides and organohydrogenpolysiloxanes having at least two hydrogen atoms each attached to a silicon atom in a molecule.

The organic peroxide is any of organic peroxides commonly used for crosslinking of silicone rubber compositions. Examples include benzoyl peroxide, 2,4-dichlorobenzoyl peroxide, 4-monochlorobenzoyl peroxide, dicumyl peroxide, tert-butylperbenzoate, tert-butyl peroxide, 2,5-dimethyl-2,5-bis(tert-butylperoxy)hexane, and cumyl-tert-butyl peroxide alone or in admixture of two or more. The organic peroxides are preferably blended in amounts of 0.2 to 5 parts by weight per 100 parts by weight of component (A).

Where the diorganopolysiloxane (A) has an aliphatic unsaturated group, the organohydrogenpolysiloxane may be used as the curing agent for the fluorosilicone rubber composition according to the present invention. In this case, curing takes place through addition reaction between the aliphatic unsaturated group in the diorganopolysiloxane and the hydrogen atom attached to a silicon atom in the organohydrogenpolysiloxane.

The organohydrogenpolysiloxane used herein is any of organohydrogenpolysiloxanes commonly used in conventional addition curing type silicone rubber compositions while it is preferably selected from the following ones.

(i) Organohydrogenpolysiloxanes of the following formulae (5) to (7).

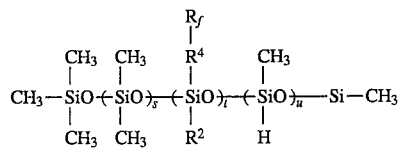
(5)

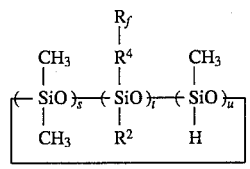
(6)

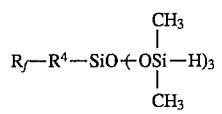
(7)

In the formulae, $R^2$, $R^4$, and Rf are as defined above, letters s and t are integers of 0 or more, and u is an integer of 2 or more.

(ii) Copolymers comprising a $(CH_3)_2HSiO_{1/2}$ and a $SiO_2$ unit, as shown by the following formula (8).

(8)

It is to be noted that these organohydrogenpolysiloxanes preferably have a viscosity of less than about 1,000 cSt at 25° C.

Preferably, the organohydrogenpolysiloxane is blended in the diorganopolysiloxane (A) such that the number of silylidyne ($\equiv$SiH) groups in the former is at least 1, especially 1 to 5 per aliphatic unsaturated hydrocarbon group in the latter.

In the embodiment where the organohydrogenpolysiloxane is used as the curing agent, it is preferred to use a platinum group metal catalyst as an addition reaction catalyst. Such platinum group metal catalysts include platinum, palladium and rhodium catalysts, with the platinum catalysts being preferred. Exemplary platinum catalysts include platinum black, chloroplatinic acid, complexes of chloroplatinic acid with olefins (e.g., ethylene), alcohols, ethers, aldehydes, or vinylsilanes or vinylsiloxanes, and platinum powder on carriers such as alumina, silica and asbestos. The platinum group metal catalyst is blended in amount of about 1 to 500 parts, especially about 5 to 20 parts by weight, calculated as platinum group metal, per million parts by weight of component (A).

Various additives may be added to the fluorosilicone rubber composition according to the present invention as long as they do not adversely affect the intended improvement of solvent resistance. Useful additives which are blended if desired include dispersants such as diphenylsilane diol, hydroxyl end-capped dimethylpolysiloxane having a low degree of polymerization, and hexamethyldisilazane, heat resistance enhancers such as ferrous oxide, ferric oxide, cerium oxide, and iron octylate, and coloring agents such as pigments.

In the other embodiment, a layer of fluorocarbonsiloxane rubber is formed on the outer surface of a belt body. Preferably the fluorocarbonsiloxane rubber has a perfluoroalkyl ether and/or perfluoroalkyl group in a backbone. More preferably, the fluorocarbonsiloxane rubber layer is a cured product of a fluorocarbonsiloxane rubber composition comprising (D) a fluorocarbon polymer predominantly comprising a fluorocarbonsiloxane, (E) an organopolysiloxane and/ or fluorocarbonsiloxane containing at least two $\equiv$SiH groups in a molecule, (F) a filler, and (G) a catalytic amount of a catalyst.

The fluorocarbon polymer (D) is predominantly comprised of a fluorocarbonsiloxane having a recurring unit of formula (4) shown below and contains an aliphatic unsaturated group as previously described for $R^3$. Preferably the aliphatic unsaturated group is at the end of a polymer molecular chain. The polymer preferably has at the end of its backbone a vinyldialkylsilyl, divinylalkylsilyl or trivinylsilyl group, for example, in which the alkyl moiety preferably has 1 to 8 carbon atoms, with methyl most preferred.

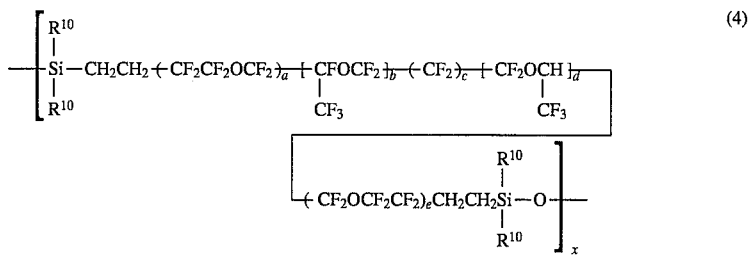

In formula (4), $R^{10}$ is a substituted or unsubstituted monovalent hydrocarbon group, preferably having 1 to 8 carbon atoms, more preferably an alkyl group having 1 to 8 carbon atoms or an alkenyl group having 2 or 3 carbon atoms, most preferably a methyl group. Letter x is an integer of at least 1, preferably 10 to 30. Each of a and e is 0 or 1, each of b and d is an integer of 1 to 4, and c is an integer of 0 to 8.

One preferred example of fluorocarbon polymer (D) is represented by the following formula (9).

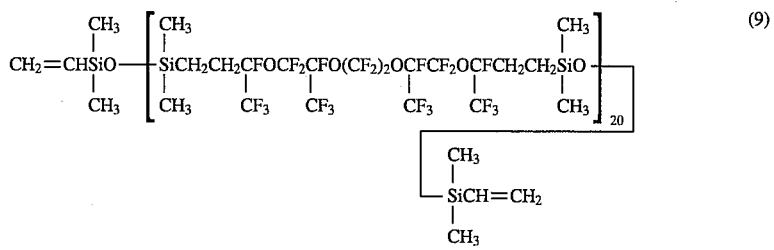

Component (E) is at least one compound selected from the group consisting of an organopolysiloxane and a fluorocarbon each containing at least two silylidyne ($\equiv$SiH) groups in a molecule, the amount of $\equiv$SiH group being 1 to 4 times that of the aliphatic unsaturated group in the fluorocarbonsiloxane rubber composition on a molar basis.

The organopolysiloxane containing a $\equiv$SiH group is selected from the same compounds as the organohydrogenpolysiloxane described for component (C).

The fluorocarbon containing a $\equiv$SiH group is preferably selected from those having a unit of formula (4) defined above or a unit of formula (4) wherein $R^{10}$ is a dialkylhydrogensiloxy group, and terminated with a SiH group such as dialkylhydrogensiloxy or silyl group. One preferred example of the fluorocarbonsiloxane is represented by the following formula (10).

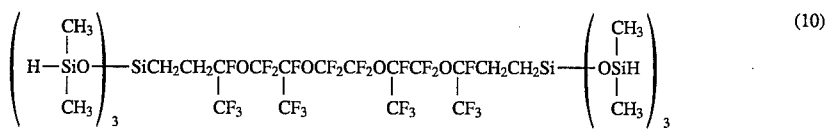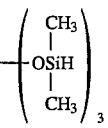

The catalyst (F) is any of known catalysts for addition reaction. Exemplary catalysts include elements of Group VIII in the Periodic Table and their compounds, for example, chloroplatinic acid, alcohol-modified chloroplatinic acid, complexes of chloroplatinic acid with olefins, platinum black, palladium on carriers such as alumina, silica and carbon, complexes of rhodium with olefins, chlorotris(triphenylphosphine)rhodium with olefins, chlorotris(triphenylphosphine)rhodium known as Wilkinson catalyst, and rhodium (III) acetylacetonate. On use, these complexes are preferably dissolved in solvents such as alcohol, ether and hydrocarbon solvents.

Component (G) is a filler whose type and amount are substantially the same as component (B) previously mentioned.

The fixing belt of the invention is prepared by coating the outer surface of a tubular belt body of heat resistant resin or metal with the fluorosilicone rubber composition or fluorocarbonsiloxane rubber composition defined above, followed by heat curing. The composition is applied by diluting it with a suitable solvent such as m-xylene hexafluoride and benzotrifluoride to form a coating solution and coating the solution by any conventional coating technique such as spraying, dipping and knife coating. The heating temperature and time for curing may be suitably chosen, typically in the range of 100° to 500 °C. and 5 seconds to 5 hours depending on the type of the tube body and the production technique used.

The rubber layer is formed on the outer surface of the belt body to any desired thickness while a thickness of about 20 to 500 μm, especially about 40 to 200 μm is preferred for providing satisfactory fixation of images.

EXAMPLE

Examples of the invention are given below by way of illustration and not by way of limitation. All parts are by weight.

Example 1

By mixing 100 parts of a fluorosilicone oil of the following formula (11), 1.4 parts of a curing agent of the following formula (12), 0.5 parts of an alcohol solution of 2 wt % chloroplatinic acid as a catalyst, 15 parts of fumed silica pretreated with a trimethylsiloxy group as a reinforcing filler, and cerium dioxide as a heat resistance enhancer, there was obtained a composition I of a fluorosilicone rubber having a perfluoroalkyl ether group in a side chain.

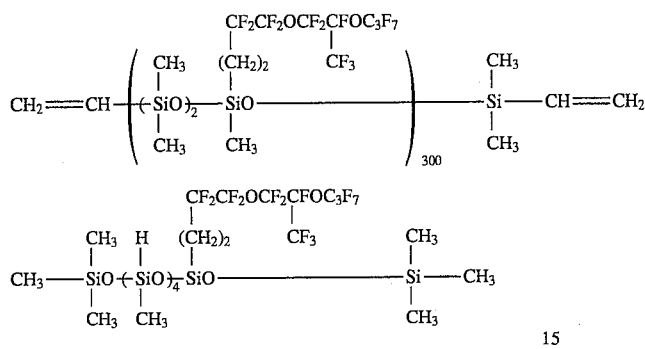

An endless fixing belt body of nickel having an axial length of 300 mm, an inner diameter of 200 mm and a wall thickness of 0.05 mm on its outer surface was cleaned with methyl alcohol, and coated with a 4-methyl-2-pentanone solution of 5 wt % tetrabutyl titanate polymer (TBT-1000(B-10), Nippon Soda K.K.) as a primer, followed by air drying for 30 minutes. Then a m-xylene hexafluoride solution of 10 wt % composition I was applied to the precoated outer surface of the belt body by a spray coating technique, air dried for 30 minutes and heat cured at 150° C. for one hour. There was obtained a fixing belt in which composition I was effectively coated and bonded to the outer surface of the nickel belt body to a thickness of 0.10 mm.

The resulting fixing belt was examined by a toner release test. This test is schematically shown in FIG. 1. A toner layer 2 of about 100 μm thick was placed on a sheet 1 of PPC paper (Type 6200, Ricoh K.K.) in a section. A piece of the fixing belt 3 (including a rubber layer 4 and a belt body 5) was placed on the toner-bearing sheet. Using a heat seal tester 6 (model 7P-701-B, Tester Industry K.K.), the belt 3 was pressed against the sheet 1 at a temperature of 180° to 200° C. and a pressure of 2.0 to 4.0 kg/cm² for one second. Then the belt was separated from the sheet. The fixing belt having composition I coated thereon was smoothly released from the sheet without adhesion of the toner to the belt.

Composition I was examined by a silicone oil resistance test. Using a silicone oil (KF-96, viscosity 100 cSt, Shin-Etsu Chemical Co., Ltd.) as a test oil, an immersion test according to the vulcanized rubber physical test (JIS K-6301) was carried out at 200° C. for 72 hours. Upon immersion in silicone oil, composition I showed a weight gain of 1.8% and a volume gain of 2.3%, which indicated minimal oil swelling.

It is seen from these results that the fixing belt of this example shows good toner release and silicone oil resistance and is thus fully useful as a fixing belt.

Example 2

By mixing 100 parts of a fluorosilicone oil of the following formula (13), 1.20 parts of a curing agent of the following formula (14), 0.2 parts of an alcohol solution of 2 wt % chloroplatinic acid as a catalyst, 12 parts of fumed silica pretreated with a trimethylsiloxy group as a reinforcing filler, and cerium dioxide as a heat resistance enhancer, there was obtained a composition II of a fluorosilicone rubber having a perfluoroalkyl group in a side chain.

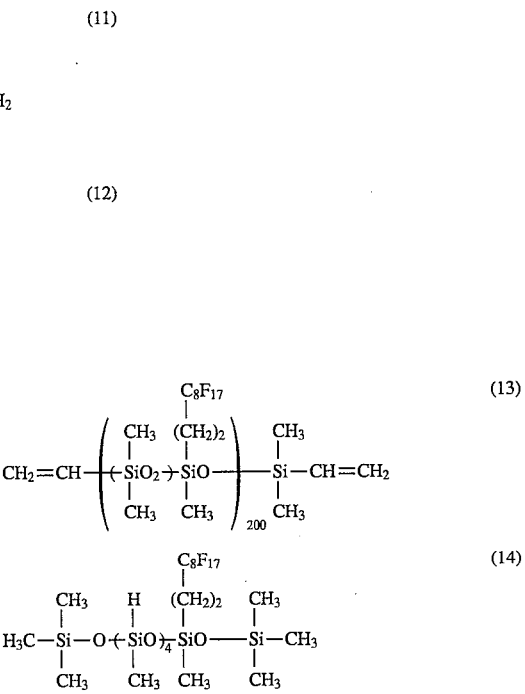

As in Example 1, an endless fixing belt body of nickel was cleaned, coated with a primer, and air dried. Then a m-xylene hexafluoride solution of 10 wt % composition II was applied to the belt outer surface by a spray coating technique, air dried for 30 minutes and heat cured at 150° C. for one hour. There was obtained a fixing belt in which composition II was effectively coated and bonded to the outer surface of the nickel belt body to a thickness of 0.10 mm.

The fixing belt was examined by a toner release test as in Example 1. The fixing belt having composition II coated thereon was smoothly released from the sheet without adhesion of the toner to the belt.

Composition II was examined by a silicone oil resistance test as in Example 1. Upon immersion in silicone oil, composition II showed a weight gain of 2.7% and a volume gain of 3.0%, which indicated minimal oil swelling.

It is seen from these results that the fixing belt of this example shows good toner release and silicone oil resistance and is thus fully useful as a fixing belt.

Example 3

By mixing 100 parts of a fluorocarbonsiloxane of the following formula (15), 3.87 parts of a curing agent of the following formula (16), 1.0 parts of a toluene solution of 1 wt % tris(triphenylphosphine) rhodium (I) chloride as a catalyst, and 12 parts of fumed silica pretreated with a trimethylsiloxy group as a reinforcing filler, a fluorocarbonsiloxane rubber composition III was obtained.

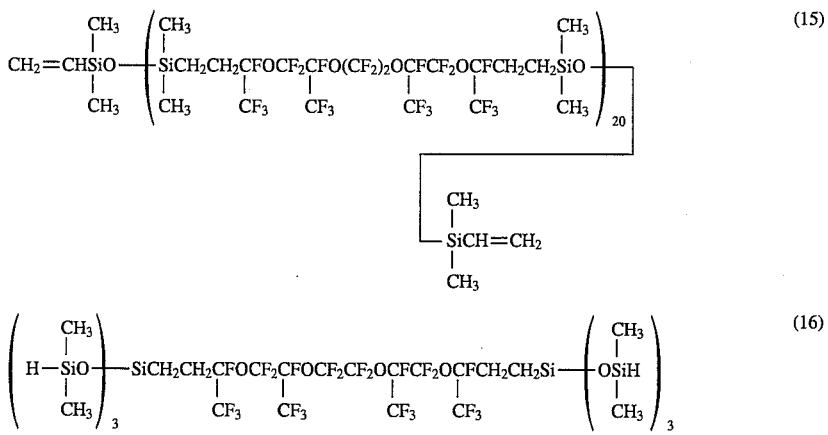

An endless fixing belt body of nickel was cleaned, coated with a primer, and air dried as in Example 1. Then a benzotrifluoride solution of 20 wt % composition III was applied to the belt outer surface by a dipping technique, air dried for 30 minutes and heat cured at 150° C. for one hour. There was obtained a fixing belt in which composition III was effectively coated and bonded to the outer surface of the nickel belt body to a thickness of 0.05 mm.

The fixing belt was examined by a toner release test as in Example 1. The fixing belt having composition III coated thereon was smoothly released from the sheet without adhesion of the toner to the belt.

Composition III was examined by a silicone oil resistance test as in Example 1. Upon immersion in silicone oil, composition III showed a weight gain of 2.8% and a volume gain of 3.2%, which indicated minimal oil swelling.

It is seen from these results that the fixing belt of this example shows good toner release and silicone oil resistance and is thus fully useful as a fixing belt.

Comparative Example 1

By mixing 100 parts of a silicone oil having a viscosity of 10,000 cSt of the following formula (17), 1.4 parts of a curing agent having a viscosity of 12 cSt of the following formula (18), 0.4 parts of an alcohol solution of 2 wt % chloroplatinic acid as a catalyst, and 20 parts of fumed silica pretreated with a trimethylsiloxy group as a reinforcing filler, a silicone rubber composition IV was obtained.

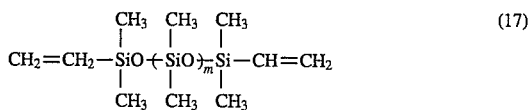

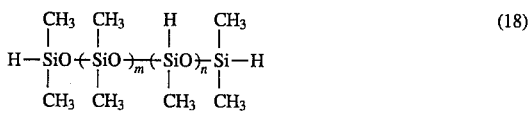

An endless fixing belt body of nickel was cleaned, coated with a primer, and air dried as in Example 1. Then a heptane solution of 15 wt % composition IV was applied to the belt outer surface by a dipping technique, air dried for 30 minutes and heat cured at 150° C. for one hour. There was obtained a fixing belt in which composition IV was effectively coated and bonded to the outer surface of the nickel belt body to a thickness of 0.08 mm.

The fixing belt was examined by a toner release test as in Example 1. The fixing belt having composition IV coated thereon was smoothly released from the sheet without adhesion of the toner to the belt.

Composition IV was examined by a silicone oil resistance test as in Example 1. Upon immersion in silicone oil, composition IV showed a weight gain of 19.3% and a volume gain of 27.3%, which indicated substantial oil swelling.

There has been described a fixing belt which shows at least equal toner release to conventional silicone rubbers and minimal swell with silicone oil and is thus helpful in producing quality images.

Although some preferred embodiments have been described, many modifications and variations may be made thereto in the light of the above teachings. It is therefore to be understood that within the scope of the appended claims, the invention may be practiced otherwise than as specifically described.

We claim:

1. A fixing belt of comprising an endless body having a layer of fluorocarbonsiloxane rubber formed on the outer surface thereof wherein said fluorocarbonsiloxane rubber has a perfluoroalkyl ether and/or perfluoroalkyl group in a backbone.

2. The fixing belt of claim 1 wherein said fluorocarbonsiloxane rubber is a cured product of a fluorocarbonsiloxane rubber composition comprising the following components (D) to (G), (D) a fluorocarbon polymer predominantly comprising a fluorocarbonsiloxane having a recurring unit of the general formula (4):

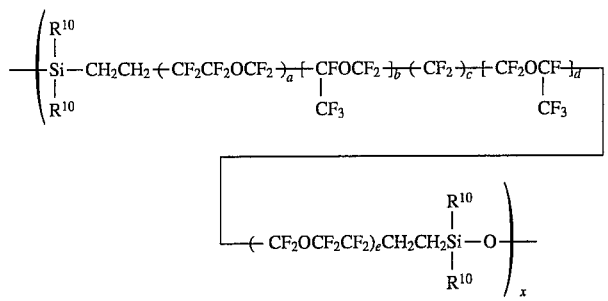

(4)

wherein $R^{10}$ is a halogen-substituted, cyano-substituted or unsubstituted monovalent hydrocarbon group, letter x is an integer of at least 1, each of a and e is 0 or 1, each of b and d is an integer of 1 to 4, and c is an integer of 0 to 8, said fluorocarbon polymer containing an aliphatic unsaturated group, (E) an organopolysiloxane and/or fluorocarbonsiloxane containing at least two ≡SiH groups in a molecule, the content of ≡SiH group being 1 to 4 mol per mol of the aliphatic unsaturated group in said fluorocarbonsiloxane rubber composition, (F) a catalytic amount of a catalyst and (G) a filler.

3. The fixing belt of claim 2, wherein the fluorocarbon polymer, (D), contains an aliphatic unsaturated group at the end of the polymer molecular chain.

4. The fixing belt of claim 2, wherein the fluorocarbon polymer, (D), contains an aliphatic unsaturated group selected from the group consisting of a vinyldialkylsilyl group, divinylalkylsilyl group or trivinylsilyl group wherein each alkyl moiety has 1 to 8 carbon atoms at the end of the polymer molecular chain.

5. The fixing belt of claim 2, wherein, in the fluorocarbon polymer, (D), each $R^{10}$ is an alkyl group of 1 to 8 carbon atoms or alkenyl group of 2 to 3 carbon atoms.

6. The fixing belt of claim 2, wherein, in the fluorocarbon polymer, (D), x is an integer of 10 to 30.

7. The fixing belt of claim 2, wherein the catalyst, (F), is a compound of a Group VIII element.

8. The fixing belt of claim 2, wherein the filler, (G), is a silica powder.

9. The fixing belt of claim 1, wherein the endless body is formed of a polyimide resin, fluororesin, polyester resin, stainless steel or nickel material having heat resistance at temperatures of 150° to 180° C.

10. The fixing belt of claim 1, wherein the endless body has a wall thickness of 20 to 300 μm.

11. The fixing belt of claim 1, wherein the layer of fluorocarbonsiloxane rubber is 20 to 500 μm thick.

* * * * *